(12) United States Patent
Zeng et al.

(10) Patent No.: US 9,840,302 B2
(45) Date of Patent: Dec. 12, 2017

(54) SMART BALANCE WHEEL WITH BOLT-SHAFT STRUCTURE

(71) Applicant: Guangdong Longshine Technology Company Limited, Dongguan, Guangdong (CN)

(72) Inventors: Yongfu Zeng, Guangdong (CN); Liangmao Liao, Guangdong (CN); Agan Gan, Guangdong (CN)

(73) Assignee: GUANGDONG LONGSHINE TECHNOLOGY COMPANY LIMITED, Dongguan (CN)

( * ) Notice: Subject to any disclaimer, the term of this patent is extended or adjusted under 35 U.S.C. 154(b) by 0 days.

(21) Appl. No.: 15/076,958

(22) Filed: Mar. 22, 2016

(65) Prior Publication Data

US 2017/0183053 A1    Jun. 29, 2017

(30) Foreign Application Priority Data

Dec. 28, 2015 (CN) .......................... 2015 1 0996861

(51) Int. Cl.
| | |
|---|---|
| *B62K 11/00* | (2006.01) |
| *B60L 11/18* | (2006.01) |
| *B60K 1/02* | (2006.01) |
| *B60Q 1/50* | (2006.01) |

(52) U.S. Cl.
CPC .............. *B62K 11/007* (2016.11); *B60K 1/02* (2013.01); *B60L 11/1809* (2013.01); *B60Q 1/50* (2013.01)

(58) Field of Classification Search
CPC .......... B62K 11/007; B60Q 1/50; B60K 1/02; B60L 11/1809
See application file for complete search history.

(56) References Cited

U.S. PATENT DOCUMENTS 9,376,155 B2 *   6/2016   Ying .................... B62D 51/001

FOREIGN PATENT DOCUMENTS

WO   WO 2015/188599   12/2015

* cited by examiner

*Primary Examiner* — John Walters
*Assistant Examiner* — James Triggs
(74) *Attorney, Agent, or Firm* — Hemisphere Law, PLLC

(57) ABSTRACT

The present invention discloses a smart balance wheel with a bolt-shaft structure, comprising a fixedly connected bearing and shaft system, a balance control and drive system, a safety control and prompt system and a charging system. The fixedly connected bearing and shaft system comprises a main frame and a shaft system. The main frame comprises a left frame and a right frame symmetric to each other and rotating relative to each other. The shaft system passes through the left and right frames to realize relative rotation. The balance control and drive system is located under the fixedly connected bearing and shaft system. The present invention uses a bolt-shaft structure and a closed dustproof structure, realizes fixing of the left and right main frames, increases connection strength and bearing capacity of the frame, improves safety of balancing, controlling and driving and improves the service life.

9 Claims, 3 Drawing Sheets

SMART BALANCE WHEEL WITH BOLT-SHAFT STRUCTURE

BACKGROUND OF THE INVENTION

Technical Field

The present invention belongs to the manufacturing field of two-wheel balance wheel, and particularly to a smart balance wheel with a bolt-shaft structure.

Description of Related Art

The balance wheel gradually gets attention and affection of the youth because of its convenient carrying, simple operation and good stability. The subject of patent application for the balance wheel is currently from Hangzhou Chic Intelligent Technology Co. Limited, Segway LLC., and CHENHE. However, the present patent technology and related product have bad safety performance, operability and economic efficiency, high cost of the product, or insufficient structural efficiency, or are too heavy to carry, or insensitive to use with low safety and operability, even with fall damage. The present invention increases the carrying capacity and has sensing parts of the balance wheel that are not easy to be polluted and damaged by promoting innovation of connection and rotation strength and waterproof, dustproof and explosion-proof aspects. After years of research, the inventor of the present invention makes transformation and innovation of the smart balance wheel, adds a safety control and indication system, and improves the safety performance, operability and economic efficiency of the smart balance wheel.

BRIEF SUMMARY OF THE INVENTION

The present invention aims to provide a smart balance wheel with a bolt-shaft structure having high safety performance, easy operation, economic manufacturing cost and providing human riding and fitness.

In order to realize the above-mentioned purpose, the technical solution of the present invention is as follows:

A smart balance wheel with a bolt-shaft structure includes a fixedly connected bearing and shaft system, a balance control and drive system, a safety control and prompt system and a charging system; the fixedly connected bearing and shaft system includes a main frame and a shaft system; the main frame includes a left frame and a right frame symmetric to each other and rotating relative to each other; the shaft system passes through the left and right frames and is screwed by a nut and a screw to realize relative rotation of the left and right frames; the balance control and drive system is located under the fixedly connected bearing and shaft system; the balance control and drive system includes a control mainboard, auxiliary control boards and two motors; the two motors are installed in two wheels; the auxiliary control board detects a signal and feeds back to the control mainboard; the control mainboard calculates an instruction according to the signal and drives the motors to realize balance; the safety control and prompt system is connected with the balance control and drive system and the charging system through wiring, fixed on the main frame, and prompts safety and usage state with brightness, flashing or color of the light; and the charging system includes a battery pack fixed on the main frame.

A left drum and a right drum are disposed on the junction of the left and right frames; a spacing boss and a spacing hole are both disposed on the opposite sides of the left and right drums; the spacing boss of the left drum moves in the spacing hole of the right drum; the shaft system passes through the left and right drums to connect the left and right frames; the shaft system comprises 1-3 nuts, 2-8 washers, two shaft sleeves and a screw; the screw orderly passes through the washers, the shaft sleeves, the washers, the shaft sleeves, the washers and the nuts; and a blocking sheath for fixing the nut is disposed on the outer side of the screw where the nut and the screw are screwed.

Two ends of the shaft system are connected with two wheels; the wheels are fixed on two sides of the left and right frames; and motor shaft fixation blocks are disposed on the inner sides of the wheels for fixing each wheel with a built-in motor on the main frame.

The balance control and drive system has two auxiliary control boards, i.e., a left auxiliary control board and a right auxiliary control board, respectively; the auxiliary control boards are fixed on the main frame through auxiliary control board positioning frame; a through hole is formed on one end of each auxiliary control board positioning frame connected with the main frame; a sensing rubber mat is disposed in the through hole; a sensing rubber mat gland is disposed between the sensing rubber mat and the main frame; and the control mainboard is located between the left and right auxiliary control boards.

A battery pack is located between the left and right auxiliary control boards and fixed under the main frame or on a lower cover through a battery fixation frame; a battery cover is disposed on the lower cover; and a power switch and a charging plug in the charging system are fixed on the lower cover.

An upper cover is disposed above the main frame; the lower cover is disposed under the main frame; the upper and lower covers and the main frame are integrated; a pedal soft rubber mat is disposed between the main frame and the upper cover; and a pedal support is disposed between the pedal soft rubber mat and the main frame.

The smart balance wheel with a bolt-shaft structure further includes a safety control and prompt system including indicator light boards on the upper cover and side light boards on the lower cover; the indicator light boards are located between an indicator lamp shade and a light board gland; a U-shaped decorative lamp shade is disposed on the outer side of the side light board.

The indicator lamp shade and the decorative lamp shade are made of light diffusion materials.

The safety control and prompt system includes a central processing system, a left sensing system and a right sensing system. The left and right sensing systems are connected with the central processing system, respectively. The central processing system is connected with the battery pack and the motor.

The auxiliary control boards, the auxiliary control board positioning frames and the sensing rubber mat of the balance control and drive system form a closed dustproof structure.

When the battery pack is fixed on the lower cover through the battery fixation frame, the battery pack and the battery fixation frame are integrated, a battery window and a battery cover are disposed on the lower cover, and the battery pack is made of the material formed by stacking soft polymer sheets.

The present invention has the following beneficial effects:

1. The present invention includes a balance control and drive system, the balance control and drive system is operated by the driver to control and drive, and only when the driver stands on the wheel body and forms an angle of inclination, the motor can be started to improve the safety performance of the driver;

2. The present invention has a safety control and prompt system, and an indicator light prompts the working condition for the driver to know the state of the balance wheel;

3. The present invention connects the left and right main frames through a shaft, and realizes fixation of the left and right main frames by screwing the nut, while the existing technology uses a clamp spring that has complex operation and needs highly skilled workers, long working time, and the screw and the nut are screwed easily with less working time, and one end of the screw is fixed so that the carrying capacity is better than the bearing.

4. The left and right frames of the present invention are realized by the spacing boss and the spacing hole, which is safer than the spacing sheath; the spacing boss of the left frame moves in the spacing through hole of the right frame to realize rotation within a certain range; and mechanical testing proves that the spacing boss and the spacing through hole coordinates to greatly improve the safety performance of the main frame.

5. The auxiliary control boards, the auxiliary control board positioning frames and the sensing rubber mat of the balance control and drive system form a closed dustproof structure, thereby improving the safety of balancing, controlling and driving and improving the service life.

6. The safety control and prompt system prompts safety and usage state using brightness, flashing or color of a light in front, back, up, down, left and right directions.

Figure 1:
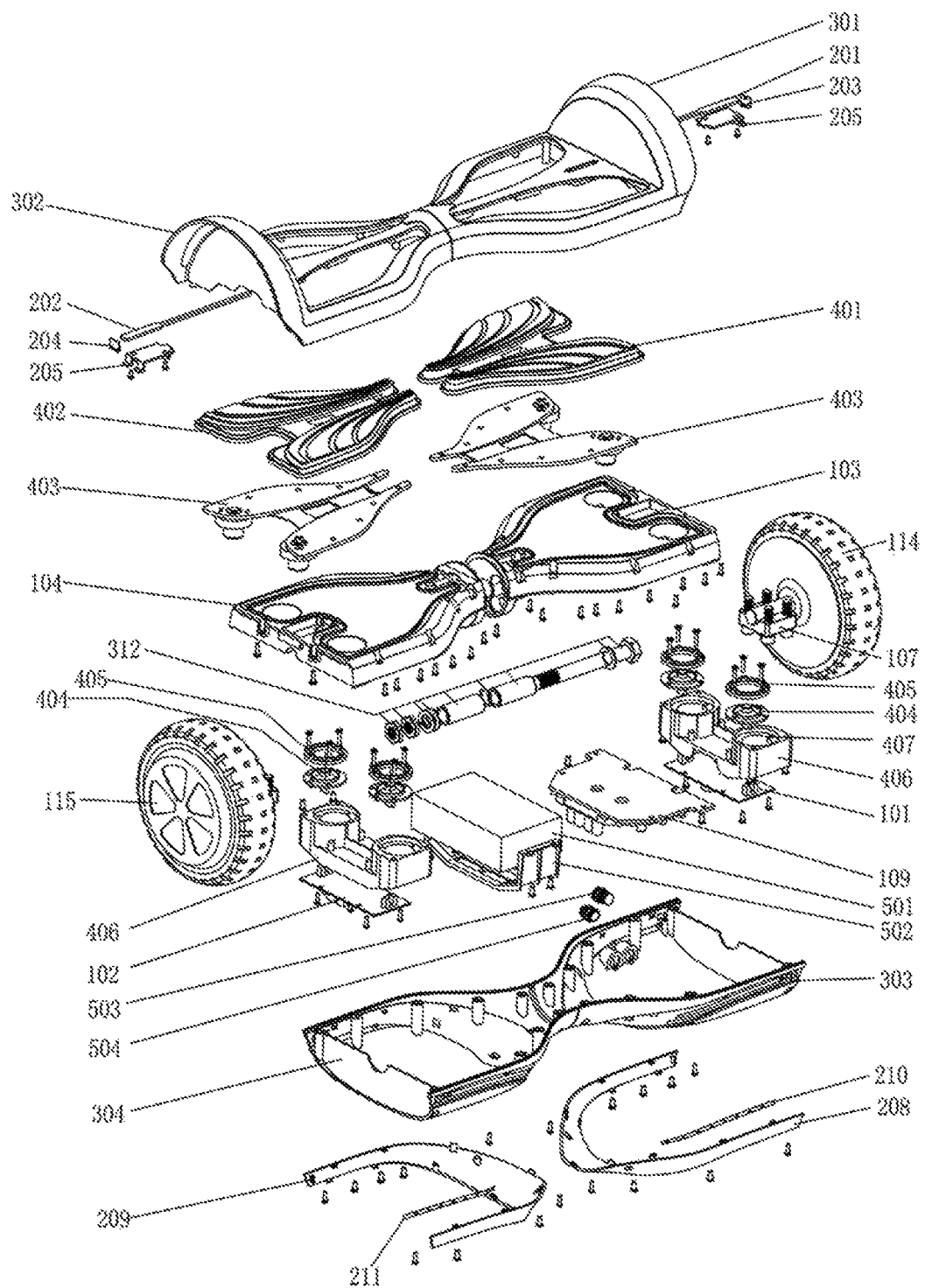
FIG. 1 is an exploded structural schematic diagram of a body of the present invention.
Figure 2:
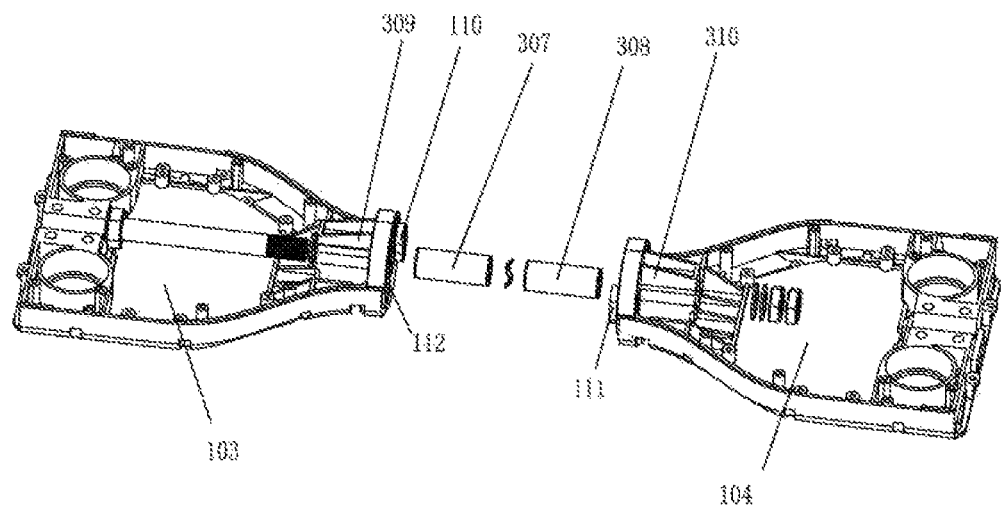
FIG. 2 is a structural schematic diagram of a main frame in FIG. 1.
Figure 3:
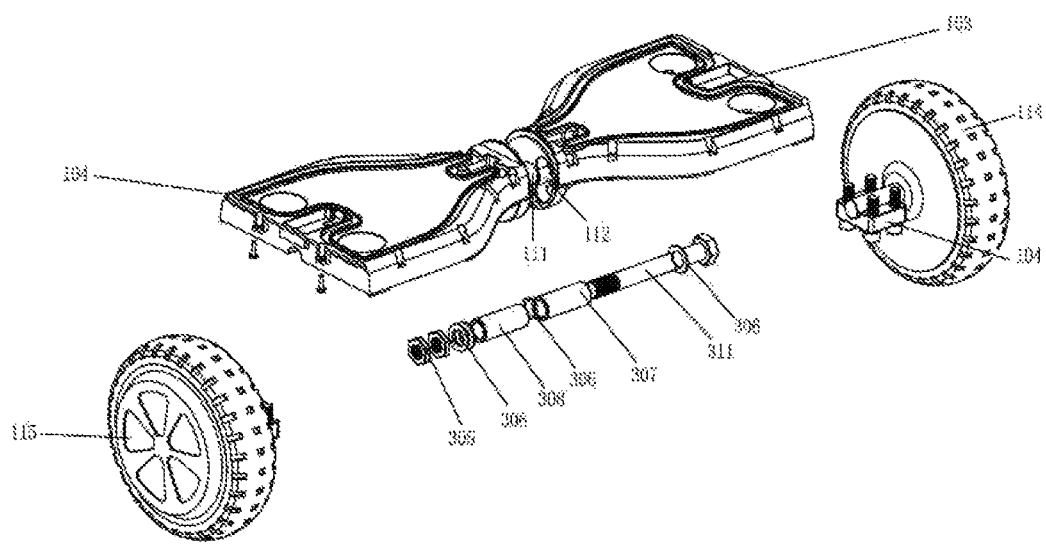
FIG. 3 is a structural schematic diagram of a shaft system in FIG. 1.
Figure 4:
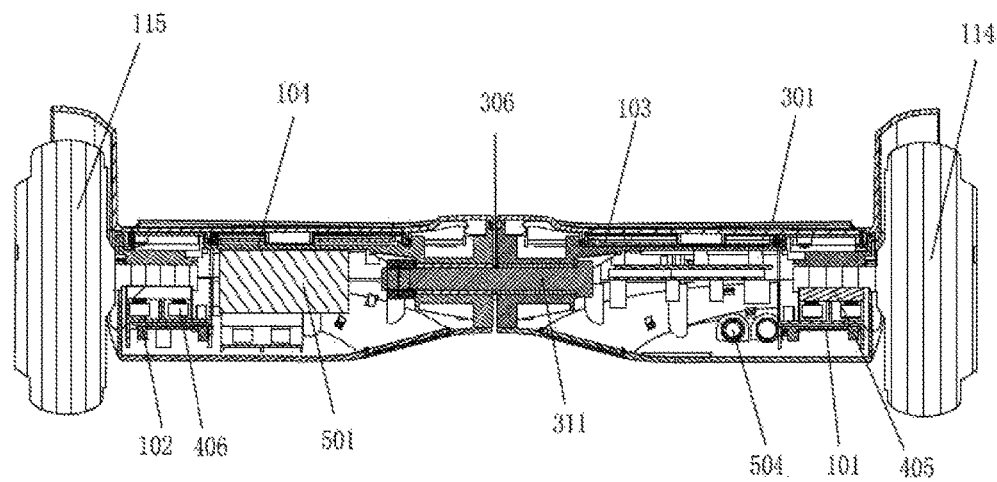
FIG. 4 is a sectional side schematic diagram after combining components in FIG. 1.

In the Figures: 101. Left auxiliary control board; 102. Right auxiliary control board; 103. Left frame; 104. Right frame; 105. Left motor; 106. Right motor; 107. Left motor shaft fixation block; 108. Right motor shaft fixation block; 109. Control board; 110. Left spacing boss; 111. Right spacing boss; 112. Left spacing through hole; 113. Right spacing through hole; 114. Left wheel; 115. Right wheel; 201. Left indicator lamp shade; 202. Right indicator lamp shade; 203. Left indicator light board; 204. Right indicator light board; 205. Light board gland; 206. Left side light board; 207. Right side light board; 208. Left decorative lamp shade; 209. Right decorative lamp shade; 301. Left upper cover; 302. Right upper cover; 303. Left lower cover; 304. Right lower cover; 305. Nut; 306. Washer; 307. Left shaft sleeve; 308. Right shaft sleeve; 309. Left drum; 310. Right drum; 311. Rotating screw; 312. Shaft system; 401. Left pedal soft rubber mat; 402. Right pedal soft rubber mat; 403. Pedal support; 404. Sensing rubber mat; 405. Sensing rubber mat pressing block; 406. Auxiliary control board positioning frame; 407. Through hole; 501. Battery pack; 502. Battery fixation frame; 503. Power switch; 504. Charging plug; 601. Central processing system; 602. Left sensing system; 603. Right sensing system; 604. Bearing sensing switch; 605. Left motor drive; 606. Control processor; 607. LED indicator; 608. Audible alarm; 609. Right motor drive; 610. Left speed sensor; 611 speed sensor; 612. Battery indicator; 613. Travelling indicator.

DETAILED DESCRIPTION OF THE INVENTION

The specific embodiment of the present invention is further illustrated according to the accompanying drawings.

Referring to FIGS. 1-4:

A smart balance wheel with a bolt-shaft structure includes a fixedly connected bearing and shaft system. The fixedly connected bearing and shaft system includes a main frame and a shaft system. The main frame includes a left frame 101 and a right frame 102 symmetric to each other and rotating relative to each other. A left drum 309 and a right drum 310 are disposed on the opposite sides of the left frame 101 and the right frame 102, respectively. The shaft system passes through the left drum 309 and the right drum 310 to realize relative rotation of the left frame 103 and the right frame 104. A left spacing boss 110 and a left spacing through hole 112 are formed inside the left drum 309, and a right spacing boss 111 and a right spacing through hole 113 are formed inside the right drum 310. The left spacing boss 110 moves within the right spacing through hole 112, and the right spacing boss 111 moves within the left spacing through hole 112, thereby realizing relative rotation of the left frame 103 and the right frame 104. The angle of the relative rotation of the left frame 103 and the right frame 104 is controlled by the area proportion of the left spacing through hole 110 and the right spacing boss 113. The smart balance wheel with a bolt-shaft structure further includes a balance control and drive system and a charging system. The balance control and drive system is located under the fixedly connected bearing and shaft system and includes a control main board 109, two auxiliary control boards and two motors. The two auxiliary control boards are the left auxiliary control board 101 and the right auxiliary control board 102, respectively. The two motors are the left motor 105 and the right motor 106, respectively and are installed inside the left wheel 114 and the right wheel 115, respectively. The left auxiliary control board 101 and the right auxiliary control board 102 detect a signal and feed back to the control main board 109. The control main board 109 calculates an instruction according to the signal and drives the left motor 114 and the right motor 115 to realize balance. The charging system includes a battery pack 501 fixed on the main frame.

Further, the shaft system passes through the left and right drums to connect the left frame 103 and the right frame 104. The shaft system includes 2 nuts 305, 4 washers 306, two shaft sleeves and a screw 311. The screw 311 orderly passes through one washer 306, the right shaft sleeve 308, one washer 306, the left shaft sleeve 307, two washers 306 and 2 nuts 305. A blocking sheath for fixing the nut 305 is disposed on the outer side of the screw 311 where the nut 305 and the screw 311 are screwed.

Two ends of the shaft system are connected with two wheels. The left wheel 114 is fixed on the outer side of the left frame 103, and the right wheel 115 is fixed on the outer side of the right frame 104. A left motor shaft fixation block 107 is disposed on the inner side of the left wheel 114 for fixing the left wheel 114 with a built-in motor 105 on the left frame 104, and a right motor shaft fixation block 108 is disposed on the inner side of the right wheel 115 for fixing the right wheel 115 with a built-in right motor 106 on the right frame 104, i.e., the left wheel 114 is fixed on the left frame 103, and the right wheel 115 is fixed on the right wheel 104. The left frame 103 and the right frame 104 can rotate relative to each other.

The balance control and drive system has two auxiliary control boards, i.e., the left auxiliary control board 101 and the right auxiliary control board 102, respectively. The left auxiliary control board is fixed on the left frame 103 through an auxiliary control board positioning frame 406, and the right auxiliary control board 102 is fixed on the right frame 104 through the auxiliary control board positioning frame 406. A through hole 407 is formed on one end of the left auxiliary control board fixation frame connected with the left frame 103. A sensing rubber mat 404 is disposed inside the through hole 407. A sensing rubber mat gland 405 is disposed between the sensing rubber mat 404 and the main frame. The control main board 109 is located between the left auxiliary control board 101 and the right auxiliary control board 102.

The battery pack 501 is located on the lower side of the mainboard and between the left auxiliary control board 101 and the right auxiliary control board 102. The battery pack 501 is fixed on the lower cover through a battery fixation frame 502. The power switch 503 and the charging plug 504 in the charging system are fixed on the lower cover.

An upper cover is disposed above the main frame, including a left upper cover 301 and a right upper cover 302. The lower cover is disposed under the main frame. The lower cover includes a left lower cover 303 and a right lower cover 304. The upper and lower covers and the main frame are integrated. A pedal soft rubber mat 401/402 is further disposed between the main frame and the upper cover; and a pedal support 403 is disposed between the pedal soft rubber mat 401/402 and the main frame.

The smart balance wheel with a bolt-shaft structure further includes a safety control and prompt system including left and right indicator light boards 203/204 on the upper cover and left and right side light boards 206/207 on the lower cover. The left and right indicator light boards are located between left and right indicator lamp shades and a light board gland; a decorative lamp shade is disposed on the outer side of the side light board. The main function of the safety control and prompt system is that the left and right indicator boards are turned on when the balance wheel moves, the side light displays the travelling state, and when the wheel moves too fast, it makes a loud sound. When the power runs low, a power indicator light is used for prompting.

The left and right indicator lamp shade 201/202 and the left and right decorative lamp shade 208/209 are made of light diffusion materials.

Figure 5:
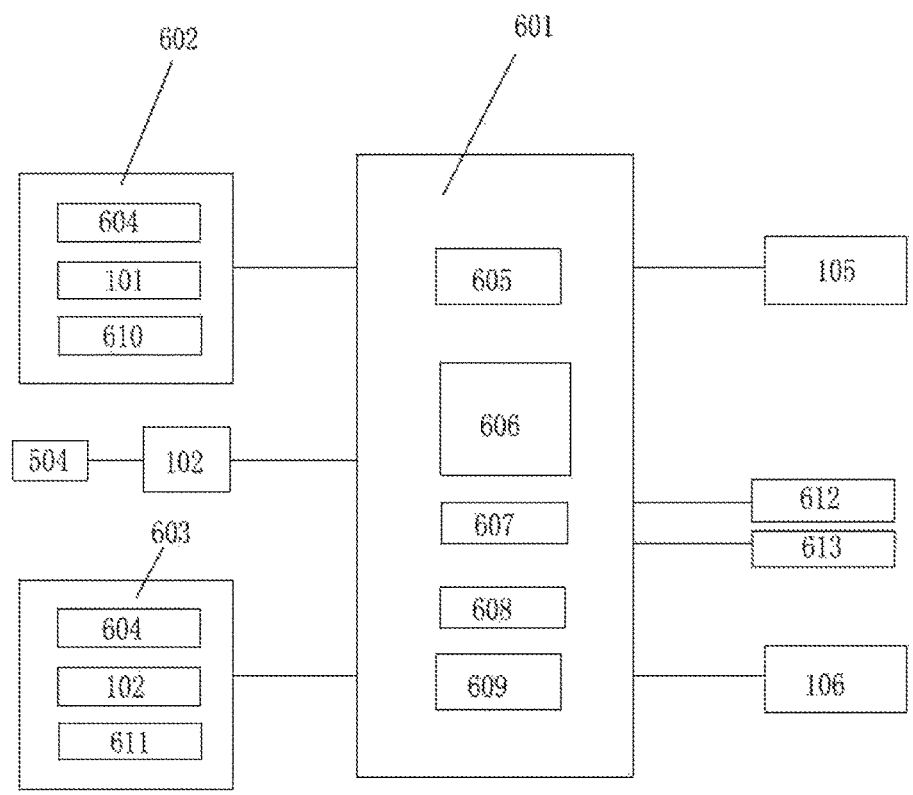
FIG. 5 is a structural schematic diagram of a circuit of an embodiment.

Referring to FIG. 5, the safety control and prompt system includes a central processing system 601, a left sensing system 602 and a right sensing system 603. The left and right sensing systems 602 and 603 are connected with the central processing system 601, respectively. The central processing system 601 is connected with the battery pack 501, the left motor 105 and the right motor 106. Only when the bearing sensing switch 604 and the left and right auxiliary control boards 101/102 inside the left and right sensing systems 602/603 send a signal simultaneously, the central processing system 601 sends a motor driving instruction to connect the left and right motors and the battery pack, start the balance wheel and guarantee the safety of the driver. Moreover, the central processing system monitors the driving speed through a control manager. When the speed is too fast, it gives an alarm or cuts off the motor temporarily.

The foregoing does not impose any limitation to the technical scope of the present invention. Any modification, equivalent variation and decoration made to the above embodiments according to the technical essence of the present invention fall within the scope of the technical solution of the present invention.

What is claimed is:

1. A smart balance wheel with a bolt-shaft structure, characterized in that, it comprises a fixedly connected bearing and shaft system, a balance control and drive system, a safety control and prompt system and a charging system; the fixedly connected bearing and shaft system comprises a main frame and a shaft system; the main frame comprises a left frame and a right frame symmetric to each other and rotating relative to each other; the shaft system passes through the left and right frames and is screwed by a nut and a screw to realize connection and relative rotation of the left and right frames; the balance control and drive system is located under the fixedly connected bearing and shaft system; the balance control and drive system comprises a control mainboard, auxiliary control boards and two motors; two ends of the shaft system are connected with two wheels, one of the two motors is installed in one of the two wheels, the other motor is installed in the other one of the two wheels; the auxiliary control boards detect a signal and feed back to the control mainboard; the control mainboard calculates an instruction according to the signal and drives the motors to realize balance; the safety control and prompt system is connected with the balance control and drive system and the charging system through wiring, fixed on the main frame, and prompts safety and usage state with brightness, flashing or color of a light; and the charging system comprises a battery pack fixed on the main frame.

2. The smart balance wheel with a bolt-shaft structure according to claim 1, characterized in that, a left drum and a right drum are disposed on the junction of the left and right frames; a spacing boss and a spacing hole are both disposed on the opposite sides of the left and right drums; the spacing boss of the left drum moves in the spacing hole of the right drum; the shaft system passes through the left and right drums to connect the left and right frames; the shaft system comprises nuts, washers, two shaft sleeves and a screw; the screw passes through the washers, the shaft sleeves, the washers, the shaft sleeves, the washers and the nuts; and a blocking sheath for fixing the nut is disposed on the outer side of the screw where the nut and the screw are connected.

3. The smart balance wheel with a bolt-shaft structure according to claim 2, characterized in that, two ends of the shaft system are connected with two wheels; the wheels are fixed on two sides of the left and right frames; and motor shaft fixation blocks are disposed on the inner sides of the wheels for fixing each wheel with a built-in motor on the main frame.

4. The smart balance wheel with a bolt-shaft structure according to claim 1, characterized in that, the balance control and drive system has two auxiliary control boards, the two auxiliary control boards are a left auxiliary control board and a right auxiliary control board, respectively; the auxiliary control boards are fixed on the main frame through auxiliary control board positioning frames; a through hole is formed on one end of each auxiliary control board positioning frame connected with the main frame; a sensing rubber mat is disposed in the through hole; a sensing rubber mat gland is disposed between the sensing rubber mat and the main frame; and the control mainboard is located between the left and right auxiliary control boards.

5. The smart balance wheel with a bolt-shaft structure according to claim 4, characterized in that, a battery pack is located between the left and right auxiliary control boards and fixed under the main frame or on a lower cover through a battery fixation frame; a battery cover is disposed on the lower cover; and a power switch and a charging plug in the charging system are fixed on the lower cover.

6. The smart balance wheel with a bolt-shaft structure according to claim 1, characterized in that, an upper cover is disposed above the main frame; the lower cover is disposed under the main frame; the upper and lower covers and the main frame are integrated; a pedal rubber mat is disposed between the main frame and the upper cover; and a pedal support is disposed between the pedal rubber mat and the main frame.

7. The smart balance wheel with a bolt-shaft structure according to claim 1, characterized in that, the safety control and prompt system prompts safety and usage states using brightness, flashing or color of a light in front, back, up, down, left and right directions, including an indicator light board on the upper cover and a side light board on the lower cover; the indicator light board is located between an indicator lamp shade and a light board gland; a U-shaped decorative lamp shade is disposed on the outer side of the side light board; the indicator lamp shade and the decorative lamp shade are made of light diffusion materials.

8. The smart balance wheel with a bolt-shaft structure according to claim 7, characterized in that, the safety control and prompt system comprises a central processing system, a left sensing system and a right sensing system; the left and right sensing systems are connected with the central processing system respectively; and the central processing system is connected with the battery pack and the motor.

9. The smart balance wheel with a bolt-shaft structure according to claim 4, characterized in that, the auxiliary control boards, the auxiliary control board positioning frames and sensing rubber mat of the balance control and drive system form a closed dustproof structure.

* * * * *